United States Patent [19]

Olsson et al.

[11] Patent Number: 5,354,792

[45] Date of Patent: Oct. 11, 1994

[54] FLOWABILITY IMPROVING AGENT, A PROCESS FOR THE PRODUCTION THEREOF AND A USE THEREOF

[75] Inventors: Lars-Inge Olsson, Helsingborg; Kent Hamacek, Perstorp, both of Sweden

[73] Assignee: Perstorp AB, Perstorp, Sweden

[21] Appl. No.: 917,092

[22] PCT Filed: Feb. 12, 1991

[86] PCT No.: PCT/SE91/00096

§ 371 Date: Aug. 6, 1992

§ 102(e) Date: Aug. 6, 1992

[87] PCT Pub. No.: WO91/12214

PCT Pub. Date: Aug. 22, 1991

[30] Foreign Application Priority Data

Feb. 19, 1990 [SE] Sweden ............... 9000585-1

[51] Int. Cl.$^5$ .................. C08K 3/00; C08K 5/55; C08K 5/05
[52] U.S. Cl. .................. 524/6; 524/183; 524/381; 524/386; 524/388; 524/141
[58] Field of Search .......... 524/6, 183, 381, 386, 524/388, 141, 367, 375

[56] References Cited

U.S. PATENT DOCUMENTS

| | | | |
|---|---|---|---|
| 3,788,868 | 1/1974 | Kitsuda et al. | 106/90 |
| 3,827,992 | 8/1974 | Aignesberger et al. | 524/6 |
| 4,137,088 | 1/1979 | Debus et al. | 106/90 |

FOREIGN PATENT DOCUMENTS

| | | |
|---|---|---|
| 0326125 | 8/1989 | European Pat. Off. . |
| 2261659 | 2/1978 | Fed. Rep. of Germany . |
| 459968 | 8/1989 | Sweden . |

*Primary Examiner*—Paul r. Michl
*Assistant Examiner*—LaVonda DeWitt
*Attorney, Agent, or Firm*—Stevens, Davis, Miller & Mosher

[57] ABSTRACT

The invention relates to a flowability improving agent comprising a combination, calculated on a dry product, of: A) 60–99% by weight of a sulphonated melamine-formaldehyde resin, a sulphonated melamine-urea-formaldehyde resin or a sulphonated naphthalene-formaldehyde resin; C) 0.5–40% by weight of a boron containing polyhydroxycarboxylic acid or a water-soluble salt of such an acid and optionally D) 0.5–30% by weight of a compound with formula $$Ar\text{—}O\text{—}(R_1)_n\text{—}R_2$$

where Ar is unsubstituted or substituted benzene moiety or naphthalene moiety, $R_1$ is an oxyethylene group; —$CH_2CH_2O$— or an oxypropylene group;

$$-CH_2-\underset{\underset{CH_3}{|}}{CH}-O-$$

an oxyethylene chain or an oxypropylene chain with up to fifteen oxyethylene groups or oxypropylene groups or a combination of oxyethylene groups and oxypropylene groups to a chain where the sum of these groups is at most fifteen; the mean value $\bar{n}$ for n is 1–15 and $R_2$ is hydrogen or a phosphonate group with the formula $$-\underset{\underset{OM_1}{|}}{\overset{\overset{O}{\|}}{P}}-OM_2$$

where $M_1$ and $M_2$ are hydrogen ion or alkali metal ion or where $R_2$ is a group with the formula $$-\underset{\underset{M_3}{|}}{\overset{\overset{O}{\|}}{P}}-OM_2$$

where $M_2$ has the above meaning and $M_3$ is —$(R_1)_n$—O Ar where $R_1$, n and Ar have the above meaning; a process for the production of the agent and the use of the agent in a cement containing composition.

10 Claims, No Drawings

FLOWABILITY IMPROVING AGENT, A PROCESS FOR THE PRODUCTION THEREOF AND A USE THEREOF

BACKGROUND OF THE INVENTION (1) Field of the Invention

The present invention relates to a flowability improving agent which also gives a prolonged workability time of an aqueous cement containing composition, a process for the production of such an agent and a use thereof.

(2) Description of the Related Art

Flowability improving agents have been known for a long time as additives to compositions containing cement, lime and/or gypsum. Grouts, mortars, concrete, putty and self levelling floor screeds constitute examples of cement based mixtures. Usually these mixtures are composed in such a way that they contain a surplus of water as compared to the minimum amount necessary for the curing or binding reaction of the cement.

If one tried to use exactly the amount of water necessary for the curing, the mixture would get an unsatisfactory consistency and workability due to the strong attractive forces between the cement particles.

On the other hand, a too high water content in the mixture mentioned results in a drastic decrease of the strength of the cured mixture. However, to a certain extent this can be compensated by an increase of the cement content at the composition of the mixture. A too high content of cement per unit of volume has, however, the negative effect that the heat release at the curing reaction may result in crack formations and other less desirable effects. Also from an economical viewpoint it is undesirable to use a higher content of cement than necessary.

Nowadays, cement based mixtures are often pumped under pressure through a pipeline different building work sites. Then it is important that the mixture has a pumpable consistency but not too high a water content.

It is known before to use certain concrete additives to be able to decrease the water content of the concrete mixture and at the same time get a good flowability. The most well known of these additives are sulphonated naphthalene-formaldehyde resins, sulphonated melamine-formaldehyde resins, sulphonated melamine-urea-formaldehyde resins and sodium and calcium salts of ligninsulphonic acid.

Thus, these known additives give a certain effect in the respects mentioned above.

The conception of workability time is used in the present technical field to define the period of time after mixing a flowability improving agent of the above mentioned type with a concrete mixture, during which the mixture has a better flowability than the corresponding concrete mixture without any admixture of a flowability improving agent.

Different methods can be used to determine the workability time. According to the present patent application a standardized Swedish method, SS 137121 is used for consistency measuring. Therein a metal cone is filled with a concrete mixture whereupon the cone is lifted up and taken away leaving the unsupported cone of concrete. Then the concrete cone sinks down.

The difference between the height of the concrete cone and the metal cone, the so-called slump is used as a measure of the consistency of the concrete. Then the slump is measured on a concrete mixture before the admixture of a flowability improving agent and after the admixture thereof. Samples are taken out at even intervals until the slump of the concrete mixture containing the flowability improving agent has reached the same value as the concrete mixture had before the addition of the agent. The time period measured constitutes the workability time.

Today, concrete producers and building contractors often have very big problems with a too short workability time of the concrete. Thus, the effect of the flowability improving agent in the concrete decreases too quickly. Sometimes, for instance the transport of the concrete from the concrete factories to the building sites takes too long preventing the concrete from filling the molds etc before it loses its flowability. Moreover, on the building site pouring stops can occur because of different reasons. When the pouring then starts again the concrete has lost a great deal of its workability. This causes big problems especially if pumping of flow concrete is involved. A plugged pump conduit can result in very big economic consequences.

The problems with a too short workability time are particularly big at high concrete temperatures during summer time and with pouring with warm concrete during winter time.

Of the above flowability improving agents, above all sulphonated melamine-formaldehyde resins and sulphonated naphthalene-formaldehyde resins are used for flow concrete. Then the problems disclosed above occur.

Very big research efforts have been spent in many places in the world to solve the problem with too short a workability time of concrete. In certain cases it has partially been possible to extend the workability time. However, at the same time other problems have appeared, such as a decreased short time strength, an increased air content, a risk of false set or an extremely prolonged time of initial setting of the concrete. These problems are so serious per se that it cannot be said that the problem with a short workability time has been solved in a satisfactory way before.

SUMMARY OF THE INVENTION

According to the present invention it has now been possible to solve the above problem of a short workability time without the appearance of the other problems mentioned.

Thus, the invention relates to a flowability improving agent which also gives a prolonged workability time of a cement containing aqueous composition. Calculated on a dry product the agent comprises a combination of A) 60–99% by weight of sulphonated melamine-formaldehyde resins, a sulphonated melamine-urea-formaldehyde resin or a sulphonated naphthalene-formaldehyde resin.

C) 0.5–40% by weight of a boron containing polyhydroxy carboxylic acid or a watersoluble alkali salt or alkaline earth metal salt of such an acid which per se has got the formula

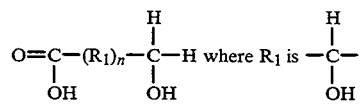

and n is 3–8, preferably 4–6 and possibly

D) 0.5–30% by weight of a compound with the general formula $$ArO-[R_1]_n-R_2$$

where Ar is a possibly substituted benzene group or naphtalene group, $R_1$ is an oxyethylene group; —$CH_2CH_2O$— or an oxypropylene group;

$$-CH_2-\underset{\underset{CH_3}{|}}{CH}-O-$$

oxyethylene chain or an oxypropylene chain with up to fifteen oxyethylene groups or oxypropylene groups or a combination of oxyethylene groups and oxypropylene groups to a chain where the sum of these groups is at most fifteen; the mean value $\underline{n}$ for n is 1–15 and $R_2$ is hydrogen or a phosphonate group with the formula $$-\underset{\underset{OM_1}{|}}{\overset{\overset{O}{\|}}{P}}-OM_2$$

where $M_1$ and $M_2$ are hydrogen ion or alkali metal ion or where $R_2$ is a group with the formula $$-\underset{\underset{M_3}{|}}{\overset{\overset{O}{\|}}{P}}-OM_2$$

where $M_2$ has the above meaning and $M_3$ is $$-[R_1]_n-OAr$$

where $R_1$, n and Ar have the above meaning.

DETAILED DESCRIPTION OF THE PREFERRED EMBODIMENTS

The compound A) of the flowability improving agent can be produced in many different ways. One suitable method is shown in the Swedish patent 7414830-5, which discloses sulphonated melamine-formaldehyde resins. The commercial product Melment L-10 sold in Sweden by Cementa under the name Cementa flow additive V 33 as well as the products PERAMIN F ® and PERAMIN F$^P$ ®, both sold by Perstorp AB, can be used as component A) according to the present invention.

The published Japanese patent application 57-100959 also relates to production of sulphonated melamine-formaldehyde resins. Said process can be used too at the production of the component A) above.

Furthermore, the U.S. Pat. No. 2,730,516, the Austrian patent 263,607 and the European patent 59,353 can be mentioned. They also relate to the production of sulphonated melamine-formaldehyde resins.

Sulphonated naphthalene-formaldehyde resins are also commercially available for instance from the French company Compagnie Francaise De Produits Industriels.

According to a preferred embodiment of the invention, $R_1$ in the compound D) is an oxyethylene group and $\underline{n}$ is 1–6.

In another preferred embodiment of the invention, $R_1$ in the compound D) consists of an oxypropylene group, whereby $\underline{n}$ is 3–8.

Ar in the compound D) is preferably a benzene group and $R_2$ is a phosphonate group with the formula $$-\underset{\underset{OM_1}{|}}{\overset{\overset{O}{\|}}{P}}-OM_2$$

where $M_1$ and $M_2$ are hydrogen ion or alkali metal ion.

It is very suitable to use a sulphonated melamine-formaldehyde resin or a sulphonated melamine-urea-formaldehyde resin compound A).

If Ar in the compound D) is substituted with an alkyl group this should preferably consist of short chains, such as $CH_3$, $C_2H_5$ or $C_3H_7$.

A flowability improving agent consisting of a combination of the compounds A) and D) above is disclosed before in the Swedish patent 8800295-1. The agent according to said patent has a tremendously good flowability improving effect on concrete for instance. However, the workability time of concrete mixtures containing that flowability improving agent is not satisfactory at certain applications. Accordingly one gets the problems mentioned above.

In the present technical field the time of initial setting is usually defined as the time period needed after the mixing of the concrete to allow the concrete to cure to such an extent that it can be flattened for instance. Of course usually a long time of initial setting of a concrete mixture is very unfavorable. Then the work has to be stopped for a long time while one waits for the concrete to cure. The initial setting time can be measured in different ways.

In the present patent application it is measured according to the Swedish standard SS 137126. Then stamps are used which are pushed into the concrete at different moments. The resistance against penetration is measured. The limit for the end of the time of initial setting according to this standard is the point of time when the resistance against penetration has reached 3.5 MPa.

A high short time strength of concrete is important from different points of view. Above all it is important to make it possible to demold as quick as possible. In the embodiment examples below the short time strength has been defined as the 24 hour compression strength.

According to the U.K. patent 1,389,407 it is known before to produce one embodiment of a compound C) of the present invention. No use of the known compound is mentioned in that U.K. patent.

In the U.S. Pat. No. 3,856,541 a concrete mixture containing a component C) of the present invention is disclosed. However, no combination with our other components is shown in this patent which relates to a prolongation of the time of initial setting of the concrete to prevent it from curing so quickly at the high temperature used (200° F. ≈ 93° C.). The problem with the workability time is not discussed at all in this U.S. patent.

Accordingly the compound C) has not been used before to prolong the workability time of concrete mixtures and the like.

Concrete mixtures containing compound A only do not give the prolonged workability time according to the present invention. The same thing is true for a combination of the compounds A and D as mentioned above.

Thus, the present invention solves a totally different problem than that according to the patents disclosed above.

It is very surprising that a flowability improving agent can be brought about according to the present invention, which agent gives a good flowability improving effect as well as a prolonged workability time of an aqueous composition containing cement by a combination of the components A) and C) and possibly D). The component C) does not give any prolonged workability time. Moreover, component A) does not give any prolonged workability time but only a good flowability improving effect.

Calculated on a dry product the agent according to the invention suitably consists of 70–99% by weight, preferably 80–99% by weight of compound A, 0.5–30% by weight, preferably 0.5–20% by weight of component C) and possibly 0.5–20% by weight of compound D).

According to one preferred embodiment of the invention the agent consists of 70–99% by weight of compound A), 0.5–20% by weight of compound C), 0.5–20% by weight of compound D) calculated on a dry product.

At another much preferred embodiment of the invention the agent consists of 70–99% by weight of compound A) and 0.5–30% by weight of compound C) calculated on a dry product.

In the formula of the compound C), n is preferably 5.

The boron in the compound C) is often present as a complex. The formulas of a few such complexes included in the present invention are shown in the U.K. patent 1,389,407 mentioned above.

According to one embodiment of the invention the component $C^1$) consisting of boric acid or a water-soluble salt of boric acid and $C^2$) a polyhydroxy carboxylic acid or a water-soluble alkali salt or an alkaline earth metal salt of such an acid having the formula

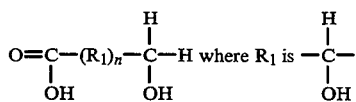

and n is 3–8, preferably 4–6, which partial components $C^1$) and $C^2$) have been mixed with the other components present in the agent.

At one suitable process for the production of the flowability improving agent according to the invention the compound $C^1$) above is added at the production of a sulphonated melamine-formaldehyde resin or a sulphonated melamine-urea-formaldehyde resins A).

Usually, an acid reaction step is included at the production of such resins. There the low pH value is brought about by means of an acid catalyst, for example consisting of an inorganic acid such as sulphuric acid, an organic acid or another acid compound.

Advantageously, the compound $C^1$) can be added at said step, especially if the compound consists of boric acid. The boric acid can work as an acid catalyst and then wholly or partly replace the above catalysts, which are usual in this connection.

However, the components $C^1$) and $C^2$) can also be added at another step of the production of the resin A).

An addition of the components $C^1$) and $C^2$) in more than one step is also possible. The components $C^1$) and $C^2$) can be added to a finished resin A) too.

Possibly also component D) is admixed at this process as mentioned above.

Of course the agent according to the present invention can be produced in other ways within the scope of the invention. Thus, the components A and C and possibly D can be mixed together in any order. The different partial components of the agent can also be added separately to a cement containing composition and then be carefully mixed with it.

The agent can be present as an aqueous solution or as a dry product. Suitably the dry product is produced by spray drying of a corresponding aqueous solution.

Preferably, the aqueous composition containing cement consists of concrete, self levelling floor screeds, grouts and mortars.

The agent according to the invention can also be used for decreasing the water content of the concrete mixture and at the same time give a good flowability and a prolonged workability time of the mixture.

The present invention will be explained more in detail in connection with the embodiment examples below, of which examples 2, 7, 8 and 9 illustrate the use of an agent according to the invention, while examples 1, 3, 4, 5 and 6 relate to comparison tests outside the scope of the invention.

EXAMPLE 1

A concrete composition was produced by mixing for 2 minutes 290 kg/m³ cement (Slite standard Portland)
1063 kg/m³ dry gravel, 0–8 mm
730 kg/m³ coarse gravel, 8–16 mm
228 kg/m³ water Directly after the production the concrete mixture had a slump of 80 mm measured according to the above method.

Thereafter, 3.8 kg/m³ (1.3% by weight of the cement) of a sulphonated melamine-formaldehyde resin PERAMIN F ® (component A) from Perstorp AB was admixed for 2 minutes.

Directly after the admixture of the sulphonated melamine-formaldehyde resin the concrete mixture had a slump of 220 mm. Then the slump was measured with an interval of 20 minutes. The following values were obtained.

| Slump, mm | |
|---|---|
| after 20 min | 195 |
| after 30 min | 130 |
| after 60 min | 100 |
| after 80 min | 80 |

Thus, 80 minutes after the admixture of the resin the slump of the concrete mixture had decreased from 220 to the value 80 it had before the addition of the resin. Accordingly the workability time measured according to the definition disclosed above was 80 minutes.

Test specimens made of the concrete mixture had a compressive strength of 7.3 MPa after 24 hours.

The time of initial setting was measured according to the above Swedish standard SS 137126. Then a value of 6.7±0.5 hours was obtained.

EXAMPLE 2

The process according to Example 1 was repeated with the difference that a mixture of 3.61 kg/m³ PERAMIN F ® (component A) and 0.19 kg/m³ sodium boroheptonate (component C) was produced and added instead of solely PERAMIN F ®.

When the mixture of sulphonated melamine-formaldehyde resin and sodium boroheptonate had been admixed to the concrete, the concrete had a slump of 220 mm. At the subsequent measuring of the change of the slump as time goes the following values were obtained.

| Slump, mm | |
|---|---|
| after 20 min | 210 |
| after 40 min | 190 |
| after 60 min | 170 |
| after 80 min | 130 |
| after 100 min | 120 |
| after 120 min | 100 |
| after 140 min | 70 |

Before the addition of the mixture of the compounds A) and C) above, the concrete of course had a slump of 80 mm as in Example 1 since the recipe and the conditions were the same.

In the present case a workability time of about 130 minutes was obtained, which is about 50 minutes longer than according to Example 1. Consequently, an agent according to the invention consisting of a mixture of the components A) and C) gave a considerably longer workability time than a known flowability improving agent consisting of component A).

The difference between the slump value before respectively after the admixture of the flowability improving agent into the concrete also gives a good measure on the flowability improving effect of the agent. In both cases the same difference 140 (220−80) was obtained, which is a good value for a flowability improving agent.

Specimens made of a concrete mixture according to example 2 had a compressive strength of 7.2 MPa after 24 hours, which is directly comparable with the result according to Example 1.

The time of initial setting was measured to 6.9±0.5 hours. Accordingly the difference in time of initial setting between the concrete mixtures of Example 1 and 2 was insignificant and definitively unimportant at to the practical use of the invention.

EXAMPLE 3

The process according to Example 2 was repeated with the difference that solely 0.19 kg/m³ sodium boroheptonate (component C) was used and no sulphonated melamine-formaldehyde resin.

Before the addition of sodium boroheptonate the concrete had a slump of 80 mm and after the addition a slump of 95 mm. This shows that sodium boroheptonate had a insignificant flowability improving effect.

At the subsequent measuring of the change of the slump as time goes the following values were obtained.

| Slump, mm | |
|---|---|
| after 20 min | 85 |
| after 40 min | 65 |

Accordingly the sodium boroheptonate gave a workability time of only about 25 minutes.

Test specimens made of the concrete mixture had a compressive strength of 7.5 MPa after 24 hours.

The time of initial setting was measured to 7.1±0.5 hours.

EXAMPLE 4

The process according to Example 3 was repeated with the difference that solely 3.8 Kg/m³ sodium boroheptonate (component C) was used and no sulphonated melamine-formaldehyde resin.

Before the addition of sodium boroheptonate the concrete had a slump of 80 mm and after the addition a slump of 220 mm. Thus, the flowability improving effect became as good as according to Examples 1 and 2.

At the subsequent measuring of the change of the slump as time goes the following values were obtained.

| Slump, mm | |
|---|---|
| after 20 min | 215 |
| after 40 min | 215 |
| after 60 min | 210 |
| after 80 min | 200 |
| after 100 min | 190 |
| after 120 min | 185 |
| after 140 min | 170 |
| after 160 min | 170 |

Sodium boroheptonate gave a very long workability time according to the above experiment.

After 7 days test specimens made of the concrete mixture had not been cured yet but had a compressive strength of 0 MPa.

A comparison of the results according to Examples 3 and 4 shows that an insignificant flowability improving effect and workability time was obtained at the use of a rather low content of sodium boroheptonate but that a good compressive strength was obtained after one day.

However, at the use of a higher content of sodium boroheptonate a good flowability improving effect and workability time were obtained. On the other hand the time of initial setting became far too long (several days) and the compressive strength after 7 days was non-existent. Thus, sodium boroheptonate per se did not give the effect which is obtained according to the present invention.

EXAMPLE 5

The process according to Example 3 was repeated with the difference that solely 0.19 kg/m³ sodium heptonate accordingly it did not contain any boron) was used and no sulphonated melamine-formaldehyde resin.

Before the addition of sodium heptonate the concrete had a slump of 80 mm and after the addition a slump of 95 mm. This shows that sodium heptonate has an insignificant flowability improving effect.

At the subsequent measuring of the change of the slump as time goes the following values were obtained.

| Slump, mm |

| | |
|---|---|
| after 20 min | 80 |
| after 40 min | 60 |

Thus, the sodium heptonate gave a workability time of only 20 minutes.

Test specimens made of the concrete mixture had a compressive strength of 7.7 MPa after one day. The time of initial setting became 7.0±0.5 hours.

EXAMPLE 6

970 g of a compound A), PERAMIN F ® from Perstorp AB and 30 g of a compound D) with the general formula ArO—$[R_1]_n$—$R_2$ where Ar is phenol, $R_1$ is —$CH_2CH_2O$—, n is 4

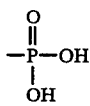

were mixed while stirring at a temperature of 35° C. until a homogenous mixture was obtained. Then pH was adjusted to 11.0 by addition of sodium hydroxide. The above combination of the components A) and D) in a flowability improving agent is disclosed in the Swedish patent 88.00295-1.

A concrete mixture was produced by mixing for 2 minutes 420 kg/m³ cement (Slite standard Portland)
880 kg/m³ dry gravel 0–8 mm
980 kg/m³ coarse gravel 8–16 mm
206 kg/m³ water Directly after the production the concrete mixture had a slump of 60 mm measured according to the above method.

Thereafter, 5.5 Kg/m³ (1.3% by weight of the cement) of the mixture of the components A) and D) produced above was admixed for 2 minutes.

Directly after the admixture of the mixture produced of the components A) and D) the concrete mixture had a slump of 220 mm. Then the slump was measured with an interval of 20 minutes. The following values were obtained.

| Slump, mm | |
|---|---|
| after 20 min | 180 |
| after 40 min | 120 |
| after 60 min | 110 |
| after 80 min | 80 |
| after 100 min | 40 |

Thus the workability time became about 90 minutes.

Test specimens made of the concrete mixture had a compressive strength of 23.5 MPa after one day.

The time of initial setting of the concrete mixture was measured to 6.7±0.5 hours.

EXAMPLE 7

The process according to Example 6 was repeated with the difference that 5.3 kg/m³ of the mixture of the compounds A) and D) produced in Example 6 was mixed with 0.2 kg/m³ of the compound C), sodium boroheptonate. The mixture of the compounds A), C) and D) were then admixed to the concrete.

Directly after the admixture of the mixture of the compounds A), C) and D) produced the concrete mixture had a slump of 230 mm. Then the slump was measured with an interval of 20 minutes. The following values were obtained.

| Slump, mm | |
|---|---|
| after 20 min | 220 |
| after 40 min | 215 |
| after 60 min | 200 |
| after 80 min | 190 |
| after 100 min | 150 |
| after 120 min | 130 |
| after 140 min | 60 |

Accordingly the workability time became 140 minutes, since the slump of the concrete before the addition was 60 mm.

Test specimens made of the concrete mixture had a compressive strength of 24.0 MPa after one day.

The time of initial setting of the concrete mixture was measured to 7.0±0.5 hours.

The above results from Examples 6 and 7 shows that a somewhat better flowability improving effect, 230 mm was obtained according to the invention (Example 7) as compared to 220 mm in Example 6. However, above all the workability time was prolonged in Example 7 to a very great extent, 140 min as compared to 90 min in Example 6. The compressive strength after one day as well as the time of initial setting became about the same in the two samples.

EXAMPLE 8

800 g water and 700 g 37% formaldehyde were charged into a reaction bulb made of glass. 350 g melamine and 285 g sodiummetabisulphite were added white stirring. The reaction mixture was heated to 75° C. while stirring. When the melamine and the sodiummetabisulphite had been completely dissolved and the reaction mixture had cleared up, 18 g 46% sodium hydroxide was added to get a pH of 10.5–11.2. The reaction mixture was kept at 75° C. until free sulphite could not be detected any more (0.5–2 h).

Then the reaction mixture was cooled down to 50° C. Thereafter 7.0 g of a compound C¹⁾ consisting of boric acid and 18.0 g sulphuric acid (96%) were added, whereby a pH of 5.8–6.1 was obtained. The condensation reaction was then allowed to continue for about 4 hours until a viscosity of 170 cp (Emilia) was obtained. Then the reaction mixture was cooled down to 35° and the pH was adjusted to 11.4 with 25.0 g 46% sodium hydroxide to give the condensation product a satisfactory storage stability. Thereafter 104 g of a compound C²⁾ consisting of sodium heptonate and 300 g water were admixed for adjusting the solids content to about 35% by weight.

The process according to Example 2 was repeated with the difference that 3.8 kg/m³ of the mixture of the compounds A), C¹⁾ and C²⁾ produced above was used. When this mixture had been admixed into the concrete the concrete had a slump of 215 mm. At the subsequent measuring of the change of the slump as time goes the following values were obtained.

| Slump, mm | |
|---|---|
| after 20 min | 210 |
| after 40 min | 200 |
| after 60 min | 175 |
| after 80 min | 140 |
| after 100 min | 110 |

-continued

| | |
|---|---|
| after 120 min | 90 |
| after 140 min | 60 |

As in Example 2 a workability time of about 130 minutes was obtained.

Test specimens made of the concrete mixture had a compressive strength of 7.8 MPa after one day.

The time of initial setting of the concrete mixture was measured to 7.0±0.5 hours.

EXAMPLE 9

The process according to Example 2 repeated with the difference that 3.61 kg/m³ PERAMIN F ® and 0.19 kg/m³ sodium boroheptonate were not mixed with each other. Instead they were added separately to the concrete. The results were the same as in Example 2.

We claim:

1. Flowability improving agent which also gives a prolonged workability time of an aqueous composition containing cement, comprising a combination, calculated on a dry product of
   A) 60–99% by weight of a resin selected from the group consisting of a sulphonated melamine-formaldehyde resin, a sulphonated melamine-urea-formaldehyde resin and a sulphonated naphthalene-formaldehyde resin;
   C) 0.5–40% by weight of a boron containing polyhydroxycarboxylic acid or a water-soluble alkali salt or alkaline earth metal salt of said acid of the formula

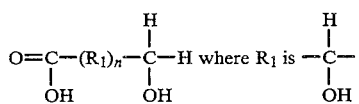

and n is 3–8, and optionally
(D) 0.5–30% by weight of a compound with the formula Ar O—(R$_1$)$_n$—R$_2$ where Ar is unsubstituted or substituted benzene moiety or naphthalene moiety, R$_1$ is an oxyethylene group;
—CH$_2$CH$_2$O— or an oxypropylene group;

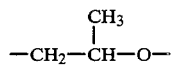

an oxyethylene chain or an oxypropylene chain with up to fifteen oxyethylene groups or oxypropylene groups or a combination of oxyethylene groups and oxypropylene groups to a chain length where the sum of these groups is at most fifteen; the mean value n for n̄ is 1–15 and R$_2$ is hydrogen or a phosphonate group with the formula

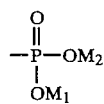

where M$_1$ and M$_2$ are hydrogen ion or alkali metal ion or where R$_2$ is a group with the formula

where M$_2$ has the above meaning and M$_3$ is —(R$_1$)$_n$—O Ar where R$_1$, n and Ar have the above meaning.

2. Agent according to claim 1, containing 70–99% by weight of compound A), 0.5–30% by weight of compound C) and optionally 0.5–20% by weight of compound D calculated on a dry product.

3. Agent according to claim 1, containing 70–99% by weight of compound A), 0.5–20% by weight of compound C) and 0.5–20% by weight of compound D calculated on a dry product.

4. Agent according to claim 1, containing 70–99% by weight of compound A) and 0.5–30% by weight of compound C) calculated on a dry product.

5. Agent according to claim 1, wherein n in the formula of compound C) is 5.

6. Agent according to claim 1, wherein the boron is present as a complex in the compound C).

7. Agent according to any one of claim 1, wherein the compound C) has been formed by two partial components namely C¹), a compound selected from the group consisting of boric acid and a water-soluble salt of boric acid and C²), a compound selected from the group consisting of a polyhydroxy carboxylic acid, a water-soluble alkali salt and an alkaline earth metal salt of said acid having the formula

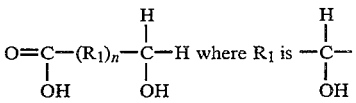

and n is 3–8.

8. Agent of claim 1 wherein n is 4–6.

9. Agent of claim 7 wherein n is 4–6.

10. Process for the production of a flowability improving agent which also gives a prolonged workability time of an aqueous composition containing cement wherein a compound C¹) selected from the group consisting of boric acid and a water-soluble salt of boric acid, is added to a compound A) selected from the group consisting of a sulphonated melamine-formaldehyde resin and a sulphonated melamine-urea-formaldehyde resin; wherein the addition of component C¹) with compound A) is then mixed with a compound C²) selected from the group consisting of a polyhydroxy carboxylic acid; a water soluble alkali salt and an alkaline earth metal salt of said acid having the formula

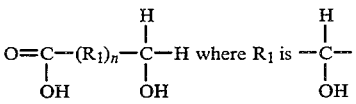

and n is 5–8 and optionally D), a compound with the general formula

Ar O—(R$_1$)$_n$—R$_2$ where Ar is unsubstituted or substituted benzene moiety or naphthalene moiety, $R_1$ is an oxyethylene group; —$CH_2CH_2O$— or an oxypropylene group;

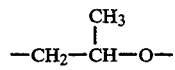

an oxyethylene chain or an oxypropylene chain with up to fifteen oxyethylene groups or oxypropylene groups or a combination of oxyethylene groups and oxypropylene groups to a chain where the sum of these groups is at most fifteen; the mean value $\bar{n}$ for n is 1–15 and $R_2$ is hydrogen or a phosphonate group with the formula

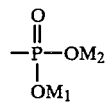

where $M_1$ and $M_2$ are hydrogen ion or alkali metal ion or where $R_2$ is a group with the formula

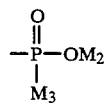

where $M_2$ has the above meaning and $M_3$ is —$(R_1)_n$—O Ar where $R_1$, n and Ar have the above meaning.

* * * * *